(12) United States Patent
Kim et al.

(10) Patent No.: US 10,703,904 B2
(45) Date of Patent: Jul. 7, 2020

(54) THERMOPLASTIC RESIN COMPOSITION AND MOLDED ARTICLE PRODUCED THEREFROM

(71) Applicant: LOTTE ADVANCED MATERIALS CO., LTD., Yeosu-si (KR)

(72) Inventors: Ik Mo Kim, Uiwang-si (KR); Kyung Rae Kim, Uiwang-si (KR); Chan Gyun Shin, Uiwang-si (KR); Sang Hyun Hong, Uiwang-si (KR); Hyoung Taek Kang, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/754,328

(22) PCT Filed: Aug. 23, 2016

(86) PCT No.: PCT/KR2016/009307
§ 371 (c)(1),
(2) Date: Feb. 22, 2018

(87) PCT Pub. No.: WO2017/034295
PCT Pub. Date: Mar. 2, 2017

(65) Prior Publication Data
US 2018/0244919 A1     Aug. 30, 2018

(30) Foreign Application Priority Data
Aug. 24, 2015  (KR) .................. 10-2015-0118860

(51) Int. Cl.
| C08L 77/10 | (2006.01) |
| C08K 7/14 | (2006.01) |
| C08J 5/00 | (2006.01) |
| C08L 23/08 | (2006.01) |
| C08K 3/00 | (2018.01) |
| C08K 3/26 | (2006.01) |
| C08K 3/36 | (2006.01) |

(52) U.S. Cl.
CPC .............. *C08L 77/10* (2013.01); *C08J 5/00* (2013.01); *C08K 3/00* (2013.01); *C08K 3/26* (2013.01); *C08K 3/36* (2013.01); *C08K 7/14* (2013.01); *C08L 23/08* (2013.01); *C08L 23/0815* (2013.01); *C08K 2003/265* (2013.01)

(58) Field of Classification Search
CPC ...... C08L 23/08; C08L 23/0815; C08L 77/10; C08J 5/00; C08K 3/00; C08K 3/26; C08K 3/36; C08K 7/14; C08K 2003/265
See application file for complete search history.

(56) References Cited

U.S. PATENT DOCUMENTS

| 5,292,805 A * | 3/1994 | Paschke ................. C08L 77/10 524/451 |
| 9,845,389 B2 | 12/2017 | Harder et al. |
| 9,932,444 B2 | 4/2018 | Washio et al. |
| 10,450,460 B2 | 10/2019 | Kim et al. |
| 2010/0160008 A1 | 6/2010 | Topoulos |
| 2010/0324195 A1 | 12/2010 | Williamson |
| 2012/0027983 A1 | 2/2012 | Elia |
| 2014/0066561 A1 * | 3/2014 | Pfleghar ................ C08K 7/14 524/407 |
| 2015/0274968 A1 * | 10/2015 | Bayer .................... C08L 77/06 523/437 |
| 2015/0329670 A1 | 11/2015 | Washio et al. |
| 2018/0244919 A1 | 8/2018 | Kim et al. |

FOREIGN PATENT DOCUMENTS

| CN | 102264839 A | 11/2011 |
| CN | 103003046 A | 3/2013 |
| CN | 104797631 A | 7/2015 |
| EP | 0368281 A1 | 5/1990 |
| EP | 0572266 A2 | 12/1993 |
| EP | 0690098 A2 | 1/1996 |
| EP | 2918624 A1 | 9/2015 |
| KR | 2010-0123178 | 11/2010 |
| KR | 10-2014-0108517 A | 9/2014 |
| KR | 10-2017-0024201 A | 3/2017 |
| KR | 10-2017-0026833 A | 3/2017 |
| WO | 2014/073219 A1 | 5/2014 |
| WO | 2017/034295 A1 | 3/2017 |

OTHER PUBLICATIONS

International Search Report in counterpart International Application No. PCT/KR2016/009307, dated Nov. 16, 2016, pp. 1-6.
Supplementary Search Report in counterpart European Application No. 16839584.6 dated Apr. 16, 2019, pp. 1-7.
Office Action in counterpart Chinese Application No. 201680048870.3 dated Aug. 16, 2019, pp. 1-6.

\* cited by examiner

*Primary Examiner* — Ana L. Woodward
(74) *Attorney, Agent, or Firm* — Additon, Higgins & Pendleton, P.A.

(57) ABSTRACT

A thermoplastic resin composition of the present invention comprises: (A) about 20 to about 70% by weight of an aromatic polyamide resin comprising at least two aromatic dicarboxylic acid units; (B) about 0.1 to about 20% by weight of an olefin-based copolymer; and (C) about 10% to about 60% by weight of an inorganic filler. The thermoplastic resin composition and a molded article produced therefrom are excellent in plateability, impact resistance, heat resistance and the like.

15 Claims, No Drawings

THERMOPLASTIC RESIN COMPOSITION AND MOLDED ARTICLE PRODUCED THEREFROM

CROSS-REFERENCE TO RELATED APPLICATIONS

This application claims priority to and the benefit of International Application No. PCT/KR2016/009307, filed Aug. 23, 2016, which published as WO 2017/034295 on Mar. 2, 2017; and Korean Patent Application No. 10-2015-0118860, filed in the Korean Intellectual Property Office on Aug. 24, 2015, the entire disclosure of each of which is incorporated herein by reference.

TECHNICAL FIELD

The present invention relates to a thermoplastic resin composition and a molded article formed of the same. More particularly, the present invention relates to a thermoplastic resin composition which exhibits improved plating adhesion and plateability while having good properties in terms of heat resistance and impact resistance, and a molded article formed of the same.

BACKGROUND ART

A thermoplastic resin has a lower specific gravity than glass or metal. Particularly, polyamide has good properties in terms of heat resistance, wear resistance, and chemical resistance and thus is widely used in electric/electronic products, automobile parts, and the like in place of glass or metal.

Accordingly, a technique of plating a polyamide resin has been developed such that the polyamide resin can have metallic appearance and thus good aesthetics while retaining good physical properties inherent thereto.

Generally, plating of a polyamide resin is intended to provide decorative features or corrosion resistance to the resin, which depends on appearance characteristics of the resin after plating and adhesion of a plating film to the resin.

Conventionally, there has been proposed a method of adding inorganic materials to a polyamide resin composition to improve plateability. However, this method has a problem in that the resin composition can have poor impact strength and thus can only be used in limited applications. In addition, there has been proposed a method of adding epoxy group-containing polyolefin to a polyamide resin composition. However, this method also has a problem of difficulty in improving impact strength.

Further, there has been proposed a method in which a polyamide resin is alloyed with an acrylonitrile-butadiene-styrene (ABS) resin or a polycarbonate resin to improve plateability. However, such an alloy resin has a problem of deterioration in heat resistance.

Therefore, there is a need for a polyamide resin composition which can have high plateability while exhibiting good properties in terms of impact resistance, heat resistance, and the like.

The background technique of the present invention is disclosed in Korean Patent Publication No. 2010-0123178.

DISCLOSURE

Technical Problem

It is one aspect of the present invention to provide a thermoplastic resin composition which can exhibit improved plating adhesion and thus high plateability through optimal selection of a polyamide resin and an impact modifier, and a molded article formed of the same.

It is another aspect of the present invention to provide a thermoplastic resin composition which can secure good appearance through optimal combination of inorganic fillers while exhibiting improved properties in terms of impact resistance, heat resistance and plateability, and a molded article formed of the same.

Technical Solution

One aspect of the present invention relates to a thermoplastic resin composition. The thermoplastic resin composition includes: about 20 wt % to about 70 wt % of (A) an aromatic polyamide resin containing at least two aromatic dicarboxylic acid units; about 0.1 wt % to about 20 wt % of (B) an olefin based copolymer; and about 10 wt % to about 60 wt % of (C) inorganic fillers.

The aromatic polyamide resin (A) may contain terephthalic acid and isophthalic acid as the aromatic dicarboxylic acid units.

The aromatic polyamide resin (A) may contain the terephthalic acid and the isophthalic acid in a weight ratio of about 6:4 to about 8:2.

The aromatic polyamide resin (A) may have a glass transition temperature of about 110° C. to about 135° C.

The aromatic polyamide resin (A) may include hexamethylene terephthalamide and hexamethylene isophthalamide.

The olefin based copolymer (B) may include: an ethylene-α-olefin copolymer; or a modified ethylene-α-olefin copolymer obtained by modifying the ethylene-α-olefin copolymer with at least one compound selected from α,β-unsaturated dicarboxylic acid and α,β-unsaturated dicarboxylic acid derivatives.

The at least one compound selected from α,β-unsaturated dicarboxylic acid and α,β-unsaturated dicarboxylic acid derivatives may include at least one selected from maleic acid, maleic anhydride, maleic hydrazide, dichloromaleic anhydride, unsaturated dicarboxylic acid, fumaric acid, citric acid, and citric acid anhydride.

The olefin based copolymer (B) may include a maleic anhydride-modified ethylene-octene copolymer.

The inorganic fillers (C) may include: first inorganic fillers including at least one of calcium carbonate, talc, mica, and wollastonite; second inorganic fillers including at least one of glass fiber, glass beads, and glass flakes; and a mixture thereof.

The inorganic fillers may include the first inorganic fillers and the second inorganic fillers in a weight ratio of about 1:1 to about 1:5.

Another aspect of the present invention relates to a molded article formed of the thermoplastic resin composition set forth above.

The molded article may have a plating adhesive strength of about 1 N/cm to about 15 N/cm, as measured on a specimen having a size of 10 cm×10 cm×3.2 mm in accordance with JIS C6481.

Advantageous Effects

The present invention provides a thermoplastic resin composition which includes a polyamide resin containing at least two aromatic dicarboxylic acid repeat units and a suitable impact modifier and thus can exhibit improved plating adhesion and thus high plateability.

In addition, the present invention provides a thermoplastic resin composition which includes two types of inorganic fillers and thus can exhibit improved properties in terms of impact resistance, heat resistance, and plateability while securing good appearance, and a molded article formed of the same.

The above and other aspects, features, and advantages of the present invention will become apparent from the detailed description of the following embodiments in conjunction with the accompanying drawings.

BEST MODE

Hereinafter, embodiments of the present invention will be described in detail.

A thermoplastic resin composition according to the present invention includes: (A) an aromatic polyamide resin containing at least two aromatic dicarboxylic acid units; (B) an olefin based copolymer; and (C) inorganic fillers.

(A) Aromatic Polyamide Resin

The aromatic polyamide resin according to the present invention contains at least two aromatic dicarboxylic acid units. For example, the aromatic polyamide resin may be a copolymer obtained by copolymerization of two or more aromatic group-containing monomers. Herein, the term "copolymer" refers to polyamide containing at least two amide and/or diamide repeat units.

Specifically, the aromatic polyamide resin has a structure in which an aromatic compound is contained in the main chain and may be obtained by polycondensation of a dicarboxylic acid monomer containing about 10 mol % to about 100 mol % of an aromatic dicarboxylic acid with a monomer composed of aliphatic diamine or alicyclic diamine. Here, the aliphatic or alicyclic diamine monomer may have 4 to 20 carbon atoms, and the aromatic dicarboxylic acid monomer contains an aromatic benzene ring and may be, for example, terephthalic acid or isophthalic acid, without being limited thereto. In other words, the aromatic polyamide resin may contain repeat units consisting of a dicarboxylic acid unit and an aliphatic or alicyclic diamine unit, wherein the dicarboxylic acid unit may include 10 mol % to 100 mol % of an aromatic dicarboxylic acid unit.

In one embodiment, the aromatic dicarboxylic acid unit may be derived from terephthalic acid, isophthalic acid, 2,6-naphthalenedicarboxylic acid, 2,7-naphthalenedicarboxylic acid, 1,4-naphthalenedicarboxylic acid, 1,4-phenylenedioxyphenylene acid, 1,3-phenylenedioxydiacetic acid, diphenic acid, 4,4'-oxybis(benzoic acid), diphenylmethane-4,4'-dicarboxylic acid, diphenylsulfone-4,4'-dicarboxylic acid, 4,4'-biphenyldicarboxylic acid, and combinations thereof. For example, the aromatic dicarboxylic acid unit may include terephthalic acid and isophthalic acid. Specifically, the terephthalic acid to the isophthalic acid may be present in a weight ratio of about 6:4 to about 8:2. This range of weight ratio provides a critical significance in that the aromatic dicarboxylic acid unit can considerably improve plating adhesion and plateability of the thermoplastic resin composition. If the aromatic dicarboxylic acid unit is composed of materials other than the compounds set forth above, the thermoplastic resin composition can have poor plateability.

In one embodiment, the dicarboxylic acid unit may further include a unit derived from a non-aromatic dicarboxylic acid in addition to the aromatic dicarboxylic acid unit. The non-aromatic dicarboxylic acid may be an aliphatic or alicyclic dicarboxylic acid. For example, the non-aromatic dicarboxylic acid may include: aliphatic dicarboxylic acids such as malonic acid, dimethyl malonic acid, succinic acid, glutaric acid, adipic acid, 2-methyladipic acid, trimethyladipic acid, pimelic acid, 2,2-dimethylglutaric acid, 2,2-diethyl succinic acid, azelaic acid, sebacic acid, and suberic acid; and alicyclic dicarboxylic acids such as 1,3-cyclopentane dicarboxylic acid and 1,4-cyclohexane dicarboxylic acid. Units derived from the non-aromatic dicarboxylic acid may be used alone or in combination thereof. The non-aromatic dicarboxylic acid unit may be present in an amount of about 90 mol % or less, for example, 80 mol % or less, specifically 70 mol % or less, more specifically 60 mol % or less in the dicarboxylic acid unit.

In one embodiment, the aliphatic diamine unit may be derived from a $C_4$ to $C_{18}$ aliphatic alkylenediamine. Examples of the $C_4$ to $C_{18}$ aliphatic alkylenediamine may include: linear aliphatic alkylenediamines such as 1,6-hexanediamine, 1,7-heptanediamine, 1,8-octanediamine, 1,9-nonanediamine, 1,10-decanediamine, 1,11-undecanediamine, and 1,12-dodecanediamine; branched aliphatic alkylenediamines such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-diethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine; and combinations thereof.

For example, the aliphatic diamine unit may be derived from at least one diamine selected from among 1,6-hexanediamine, 1,7-heptanediamine, 1,10-decanediamine, 1,11-undecanediamine, 1,12-dodecanediamine, 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-diethyl-1,7-heptanediamine, 2,3-dimethyl-1,7-heptanediamine, 2,4-dimethyl-1,7-heptanediamine, and 2,5-dimethyl-1,7-heptanediamine.

In one embodiment, the aromatic polyamide resin may include polyamide composed of hexamethylene terephthalamide and hexamethylene isophthalamide, polyamide composed of hexamethylene terephthalamide and hexamethylene adipamide, polyamide composed of hexamethylene terephthalamide and 2-methylpentamethylene terephthalamide, or a combination thereof. For example, the aromatic polyamide resin may be polyamide composed of hexamethylene terephthalamide and hexamethylene isophthalamide. The thermoplastic resin composition including the aromatic polyamide resin can have good properties in terms of heat resistance and impact resistance while exhibiting improved plating adhesion and plateability.

In one embodiment, the aromatic polyamide resin may have a glass transition temperature (Tg) of about 110° C. to about 135° C., for example, about 115° C. to about 130° C. Within this range, the aromatic polyamide resin can improve heat resistance and plateability of the thermoplastic resin composition.

In one embodiment, the molecular weight of the aromatic polyamide resin is not particularly limited, and the aromatic polyamide resin may have an intrinsic viscosity (IV) of about 0.75 dL/g or higher, for example, about 0.75 dL/g to 1.15 dL/g, as measured using a Ubbelohde viscometer in a sulfuric acid solution at about 25° C.

In one embodiment, the aromatic polyamide resin may be present in an amount of about 20 wt % to about 70 wt %, for example, about 40 wt % to about 60 wt % based on the total weight of the thermoplastic resin composition. If the amount of the aromatic polyamide resin is outside this range, the thermoplastic resin composition can have poor properties in terms of heat resistance and mechanical strength.

(B) Olefin Based Copolymer

The olefin based copolymer according to the present invention serves to improve adhesion of a molded article formed of the resin composition to a plating film (plateability) upon plating of the molded article. The olefin based copolymer may be a copolymer obtained by polymerization of an olefin monomer or a copolymer of an olefin monomer and an acrylic monomer.

In one embodiment, the olefin monomer may include $C_1$ to $C_{19}$ alkylenes. For example, the olefin monomer may include ethylene, propylene, isopropylene, butylene, isobutylene, and octane. These may be used alone or as a mixture thereof.

In one embodiment, the acrylic monomer may be (meth)acrylic acid alkyl ester or (meth)acrylic acid ester. Here, "alkyl" refers to a $C_1$ to $C_{10}$ alkyl group, and examples of the (meth)acrylic acid alkyl ester may include methyl (meth)acrylate, ethyl (meth)acrylate, propyl (meth)acrylate, and butyl (meth)acrylate. Specifically, the (meth)acrylic acid alkyl ester may be methyl (meth)acrylate.

In one embodiment, the olefin based copolymer may include an ethylene-α-olefin copolymer; or a modified ethylene-α-olefin copolymer obtained by modifying the ethylene-α-olefin copolymer with at least one compound selected from α,β-unsaturated dicarboxylic acid and α,β-unsaturated dicarboxylic acid derivatives.

Examples of the at least one compound selected from α,β-unsaturated dicarboxylic acid and α,β-unsaturated dicarboxylic acid derivatives may include maleic acid, maleic anhydride, maleic hydrazide, dichloromaleic anhydride, unsaturated dicarboxylic acid, fumaric acid, citric acid, citric acid anhydride, and combinations thereof. For example, the at least one compound may be maleic acid or maleic anhydride.

In one embodiment, as the olefin based copolymer, a maleic anhydride-modified ethylene-octene copolymer may be used. When the maleic anhydride-modified ethylene-octene copolymer is used as the olefin based copolymer, the thermoplastic resin composition can exhibit further improved compatibility and plating adhesion.

In one embodiment, the olefin based copolymer may be present in an amount of about 0.1 wt % to about 20 wt %, for example, about 3 wt % to about 18 wt % based on the total weight of the thermoplastic resin composition. If the amount of the olefin based copolymer is less than about 0.1 wt %, improvement in plateability or plating adhesion of the thermoplastic resin composition can be insignificant, whereas, if the amount of the olefin based copolymer exceeds about 20 wt %, production costs are increased and other properties such as heat resistance and rigidity can be deteriorated without improvement in impact strength of the thermoplastic resin composition.

(C) Inorganic Fillers

The inorganic fillers according to the present invention serve to provide a desired level of mechanical strength to the thermoplastic resin composition while securing good appearance and plating adhesion of the thermoplastic resin composition.

In one embodiment, the inorganic fillers may include first inorganic fillers, second inorganic fillers, or a mixture thereof. As used herein, the terms "first" and "second" are used to distinguish the kind of inorganic fillers and are not intended to limit the scope of the present invention.

In one embodiment, the first inorganic fillers may include calcium carbonate, talc, mica, wollastonite, and combinations thereof. For example, the first inorganic fillers may be calcium carbonate.

The calcium carbonate may be amorphous calcium carbonate, aragonite calcium carbonate, or calcite calcium carbonate and may have an average particle diameter of about 0.05 μm to about 300 μm.

Although the particle diameter may be represented as an average size of a group through quantification using a measurement method, a general representation of the particle diameter may include a mode diameter representing a maximum value of a distribution, a median diameter corresponding to a median value of an integral distribution curve, various average diameters (number average, length average, area average, mass average, volume average diameters, and the like), and the like. Unless otherwise stated, the particle diameter as used herein refers to D50 (a diameter at a distribution rate of 50%) which is a number average particle diameter.

In one embodiment, the second inorganic fillers may include glass fiber, glass beads, glass flakes, and combinations thereof. For example, the second inorganic fillers may be glass fiber.

The glass fiber may include any typical glass fiber known in the art and may have a diameter of about 8 μm to about 20 μm and a length of about 1.5 mm to about 8 mm. When the diameter of the glass fiber falls within this range, the glass fiber can provide high strength reinforcement, and, when the length of the glass fiber falls within this range, the glass fiber can be easily introduced into a processing machine such as an extruder and the strength of the thermoplastic resin composition can be substantially improved.

The glass fiber may be used in combination with other fiber such as carbon fiber, basalt fiber, fiber produced from biomass, and combinations thereof. Here, "biomass" refers to a source of energy originating from plants or microorganisms.

The glass fibers may have a circular shape, oval shape, rectangular shape, or dumbbell-like shape having two circles connected to each other in cross-section.

The glass fiber may have an aspect ratio of less than about 1.5 in cross-section and may be, for example, glass fiber having a circular shape and an aspect ratio of 1 in cross-section. Herein, the term "aspect ratio" is defined as a ratio of the longest diameter of the glass fiber to the smallest diameter of the glass fiber in cross-section. When the aspect ratio of the glass fiber falls within the aforementioned range, unit cost of products can be reduced. In addition, when the glass fiber has a circular shape in cross-section, the glass fiber can improve dimensional stability and appearance of the resin composition.

The glass fiber may be surface-treated with a sizing agent in order to prevent reaction with the resin and improve a degree of impregnation. Here, the surface treatment may be performed during manufacture of the glass fiber or during post-processing.

According to the present invention, it is possible to improve both appearance and plateability of the resin composition using the two types of inorganic fillers.

Specifically, the inorganic fillers according to the present invention may include the first inorganic fillers and the second inorganic fillers in a weight ratio of about 1:1 to about 1:5, for example, about 1:1.5 to about 1:4. Within this range, the thermoplastic resin composition can have good properties in terms of appearance, mechanical strength, and plating adhesion.

In one embodiment, the inorganic fillers may be present in an amount of about 10 wt % to about 60 wt %, for example, about 20 to about 55 wt %, based on the total weight of the thermoplastic resin composition. If the amount of the inorganic fillers is outside this range, the thermoplastic resin composition can have poor properties in terms of appearance, mechanical strength and plating adhesion.

In one embodiment, the thermoplastic resin composition may further include an additive, as needed. Examples of the additive may include a flame retardant, a lubricant, a plasticizer, a heat stabilizer, an antioxidant, a light stabilizer, a colorant, and the like. These may be used as a mixture thereof depending on desired properties of a molded article formed of the resin composition.

The flame retardant serves to reduce flammability of the resin composition and may include at least one of phosphate compounds, phosphite compounds, phosphonate compounds, polysiloxane, phosphazene compounds, phosphinate compounds and melamine compounds, without being limited thereto.

The lubricant serves to lubricate a surface of metal contacting the thermoplastic resin composition during processing, molding, or extrusion to facilitate flow or movement of the resin composition and may include any typical lubricant known in the art.

The plasticizer serves to increase flexibility, workability, or extensibility of the thermoplastic resin composition and may include any typical plasticizer known in the art.

The heat stabilizer serves to inhibit thermal decomposition of the thermoplastic during kneading or molding at high temperature and may include any typical heat stabilizer known in the art.

The antioxidant serves to inhibit or block a chemical reaction between the thermoplastic resin composition and oxygen to prevent the resin composition from decomposing and losing inherent physical properties and may include at least one of a phenol antioxidant, a phosphite antioxidant, a thioether antioxidant, and an amine antioxidant, without being limited thereto.

The light stabilizer serves to inhibit or prevent UV-induced decomposition and thus discoloration or loss of mechanical properties of the thermoplastic resin composition and is preferably titanium oxide.

The colorant may include any typical pigment or dye known in the art.

In one embodiment, the additive may be present in an amount of about 1 part by weight to about 15 parts by weight relative to about 100 parts by weight of the thermoplastic resin composition (i.e., (A)+(B)+(C)).

The thermoplastic resin composition according to the present invention may be prepared by any known method of preparing resin compositions. For example, the aforementioned components and, optionally, other additives are mixed, followed by melt extrusion in an extruder, thereby preparing the thermoplastic resin composition in pellet form.

In accordance with another aspect of the present invention, a molded article may be formed of the thermoplastic resin composition set forth above. The molded article according to the present invention has good properties in terms of heat resistance, impact resistance and plateability and thus can be unlimitedly used as a molded article requiring good heat resistance, impact resistance and plateability. Specifically, the molded article may be used as interior/exterior materials for automobile parts, and, particularly, the molded article subjected to plating may be used as tail trim parts for automobiles.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(a) Polyamide Resin (a-1) Polyamide composed of hexamethylene terephthalamide and hexamethylene isophthalamide, A1007 (Solvay Advanced Polymers L.L.C.)

(a-2) Polyamide composed of hexamethylene terephthalamide and 2-methylpentamethylene terephthalamide, HTN 501 (DuPont)

(a-3) Polyamide composed of hexamethylene terephthalamide and hexamethylene adipamide, A6000 (Solvay Advanced Polymers L.L.C.)

(b) Olefin Based Copolymer (b-1) Fusabond N493D (DuPont)

(b-2) Tuftec M1913 (Asahi Kasei Corporation)

(c) Inorganic Fillers (c-1) Calcium carbonate, KRISTON-SS (Dongwha Materials Corp.)

(c-2) Glass fiber, T-251H (Nippon Electric Glass Co., Ltd., diameter: 10 μm, chop length: 3 mm)

Examples 1 to 7 and Comparative Examples 1 to 5

Into a mixer, the aforementioned components were introduced in amounts as listed in Table 1, followed by dry-mixing. Then, the mixture was subjected to extrusion in a twin-screw extruder (L/D: 45, Φ: 44 mm), thereby preparing a thermoplastic resin composition in pellet form. The prepared pellets were subjected to injection molding using a 10 oz. injection machine at 330° C., thereby preparing a specimen for property evaluation.

In Table 1, the content of each component is expressed in % by weight.

TABLE 1

| | \multicolumn{7}{c}{Example} | | | | | | | \multicolumn{5}{c}{Comparative Example} | | | | |
|---|---|---|---|---|---|---|---|---|---|---|---|---|
| | 1 | 2 | 3 | 4 | 5 | 6 | 7 | 1 | 2 | 3 | 4 | 5 |
| (a-1) | 55 | 50 | 55 | 50 | 60 | 55 | 60 | 60 | — | — | — | — |
| (a-2) | — | — | — | — | — | — | — | — | 60 | — | 50 | — |
| (a-3) | — | — | — | — | — | — | — | — | — | 60 | — | 50 |
| (b-1) | 5 | 10 | — | — | 10 | 15 | — | — | — | — | 10 | 10 |
| (b-2) | — | — | 5 | 10 | — | — | 10 | — | — | — | — | — |
| (c-1) | 10 | 10 | 10 | 10 | — | — | — | 10 | 10 | 10 | 10 | 10 |
| (c-2) | 30 | 30 | 30 | 30 | 30 | 30 | 30 | 30 | 30 | 30 | 30 | 30 |

Plating adhesion, roughness after etching (Ra), blistering of plating, impact strength, and heat distortion temperature of each of the thermoplastic resin compositions prepared in Examples 1 to 7 and Comparative Examples 1 to 5 were measured by the following methods to evaluate plateability, impact resistance, and heat resistance. Results are shown in Table 2.

Property Evaluation (1) Plating adhesion (N/cm): Plating adhesion was measured on a specimen having a size of 10 cm×10 cm×3.2 mm in accordance with JIS C6481.

(2) Roughness after etching (nm): Roughness after etching was measured on a specimen having a size of 10 cm×10 cm×3.2 mm in accordance with ISO 468.

(3) Blistering of plating: A specimen having a size of 10 cm×10 cm×3.2 mm was allowed to stand at 250° C. for 10 days, followed by checking blistering of plating.

(4) Izod impact strength (kgf·cm/cm): Izod impact strength was measured on a ⅛" thick notched specimen in accordance with ASTM D256.

(5) Heat distortion temperature (° C.): Heat distortion temperature was measured on a 6.4 mm specimen under a load of 18.56 kgf/cm² in accordance with ASTM D648.

TABLE 2

| | \multicolumn{7}{c}{Example} | | | | | | | \multicolumn{5}{c}{Comparative Example} | | | | |
|---|---|---|---|---|---|---|---|---|---|---|---|---|
| | 1 | 2 | 3 | 4 | 5 | 6 | 7 | 1 | 2 | 3 | 4 | 5 |
| Plating adhesion (N/cm) | 5 | 11 | 6 | 10 | 8 | 11 | 6 | 0.4 | 0.4 | 0.2 | 2 | 3 |
| Ra after etching (nm) | 243 | 300 | 320 | 370 | 350 | 480 | 230 | 180 | 168 | 134 | 187 | 198 |
| Blistering of plating | X | X | X | X | X | X | X | X | ○ | ○ | ○ | ○ |
| Izod impact strength | 6.9 | 10.9 | 8.3 | 10.0 | 12.7 | 17.0 | 12.5 | 5.1 | 5.5 | 5.3 | 11.2 | 9.9 |
| Heat distortion temperature | 281 | 275 | 284 | 278 | 278 | 270 | 274 | 285 | 269 | 288 | 261 | 279 |

As shown in Tables 1 and 2, it can be seen that the thermoplastic resin compositions of Examples 1 to 7 exhibited good properties in terms of plateability, impact resistance, and heat resistance.

Therefore, the above experiment shows a critical significance of the combination of components of the thermoplastic resin composition according to the present invention and the amount ratio between the components in that the thermoplastic resin composition could exhibit good properties in terms of plateability, impact resistance, and heat resistance.

Although the present invention has been described with reference to some embodiments in conjunction with the accompanying drawings, it should be understood that the foregoing embodiments are provided for illustration only and are not to be in any way construed as limiting the present invention, and that various modifications, changes, alterations, and equivalent embodiments can be made by those skilled in the art without departing from the spirit and scope of the invention.

The invention claimed is:

1. A thermoplastic resin composition comprising:
   about 20 wt % to about 70 wt % of (A) an aromatic polyamide resin including units derived from at least two different aromatic dicarboxylic acids;
   about 0.1 wt % to about 20 wt % of (B) an olefin based copolymer; and
   about 10 wt % to about 60 wt % of (C) inorganic fillers comprising a mixture of: first inorganic fillers comprising calcium carbonate, talc, mica, and/or wollastonite; and second inorganic fillers comprising glass fiber, glass beads, and/or glass flakes in a weight ratio of the first inorganic fillers: the second inorganic fillers of 1:1.5 to 1:5,
   each based on the total weight of the thermoplastic resin composition.

2. The thermoplastic resin composition according to claim 1, wherein the aromatic polyamide resin (A) includes units derived from terephthalic acid and isophthalic acid as the aromatic dicarboxylic acids.

3. The thermoplastic resin composition according to claim 2, wherein the aromatic polyamide resin (A) includes units derived from the terephthalic acid and the isophthalic acid in a weight ratio of about 6:4 to about 8:2.

4. The thermoplastic resin composition according to claim 1, wherein the aromatic polyamide resin (A) has a glass transition temperature of about 110° C. to about 135° C.

5. The thermoplastic resin composition according to claim 1, wherein the aromatic polyamide resin (A) comprises units of hexamethylene terephthalamide and hexamethylene isophthalamide.

6. The thermoplastic resin composition according to claim 1, wherein the olefin based copolymer (B) comprises: an ethylene-α-olefin copolymer; and/or a modified ethylene-α-olefin copolymer obtained by modifying the ethylene-α-olefin copolymer with an α,β-unsaturated dicarboxylic acid and/or α,β-unsaturated dicarboxylic acid derivative.

7. The thermoplastic resin composition according to claim 6, wherein the α,β-unsaturated dicarboxylic acid and/or α,β-unsaturated dicarboxylic acid derivative comprises maleic acid, maleic anhydride, maleic hydrazide, dichloromaleic anhydride, and/or fumaric acid.

8. The thermoplastic resin composition according to claim 1, wherein the olefin based copolymer (B) comprises a maleic anhydride-modified ethylene-octene copolymer.

9. A molded article formed of the thermoplastic resin composition according to claim 1.

10. The molded article according to claim 9, wherein the molded article has a plating adhesive strength of about 1 N/cm to about 15 N/cm, as measured on a specimen having a size of 10 cm×10 cm×3.2 mm in accordance with JIS C6481.

11. The thermoplastic resin composition according to claim 1, wherein:
the (A) aromatic polyamide resin includes units derived from hexamethylene terephthalamide and hexamethylene isophthalamide;
the (B) olefin based copolymer includes maleic anhydride-modified ethylene-octene copolymer; and
the (C) inorganic fillers include calcium carbonate and glass fiber.

12. The thermoplastic resin composition according to claim 11, wherein a molded article formed of the thermoplastic resin composition has a plating adhesive strength of 5 N/cm to about 15 N/cm, as measured on a specimen having a size of 10 cm×10 cm×3.2 mm in accordance with JIS C6481.

13. The thermoplastic resin composition according to claim 1, wherein a molded article formed of the thermoplastic resin composition has a plating adhesive strength of 5 N/cm to 15 N/cm, as measured on a specimen having a size of 10 cm×10 cm×3.2 mm in accordance with JIS C6481.

14. A thermoplastic resin composition comprising:
about 20 wt % to about 70 wt % of (A) an aromatic polyamide resin including units derived from at least two different aromatic dicarboxylic acids;
about 0.1 wt % to about 20 wt % of (B) a maleic anhydride-modified ethylene-octene copolymer; and
about 10 wt % to about 60 wt % of (C) inorganic fillers comprising a mixture of: first inorganic fillers comprising calcium carbonate, talc, mica, and/or wollastonite; and second inorganic fillers comprising glass fiber, glass beads, and/or glass flakes in a weight ratio of the first inorganic fillers: the second inorganic fillers of 1:1 to 1:5,
each based on the total weight of the thermoplastic resin composition.

15. A thermoplastic resin composition comprising:
about 20 wt % to about 70 wt % of (A) an aromatic polyamide resin including units derived from at least two different aromatic dicarboxylic acids;
about 0.1 wt % to about 20 wt % of (B) an olefin based copolymer; and
about 10 wt % to about 60 wt % of (C) inorganic fillers comprising a mixture of: first inorganic fillers comprising calcium carbonate; and second inorganic fillers comprising glass fiber, glass beads, and/or glass flakes in a weight ratio of the first inorganic fillers: the second inorganic fillers of 1:1 to 1:5,
each based on the total weight of the thermoplastic resin composition.

\* \* \* \* \*